United States Patent [19]

Di Mino

[11] Patent Number: 5,470,594
[45] Date of Patent: Nov. 28, 1995

[54] PAPER POUCH FOR FOOD PRODUCTS

[75] Inventor: André Di Mino, Woodcliff Lake, N.J.

[73] Assignee: ADM Tronics Unlimited, Inc., Northvale, N.J.

[21] Appl. No.: 250,925

[22] Filed: May 31, 1994

Related U.S. Application Data

[63] Continuation-in-part of Ser. No. 906,431, Jun. 30, 1992, Pat. No. 5,332,586.

[51] Int. Cl.⁶ .......................... B32B 27/10; B32B 27/30; B65D 85/72
[52] U.S. Cl. .................. 426/87; 206/524.3; 206/524.7; 206/524.9; 229/3.1; 229/3.5 R; 229/244; 426/112; 426/122; 428/34.3
[58] Field of Search ..................... 426/87, 106, 112, 426/122, 127; 428/34.3; 229/3.1, 3.5 R, 243, 244; 206/524.3, 524.6, 524.7, 524.9

[56] References Cited

U.S. PATENT DOCUMENTS

| | | | |
|---|---|---|---|
| 3,558,330 | 1/1971 | Widiger et al. | 426/127 |
| 4,421,825 | 12/1983 | Seiter | 426/127 X |
| 4,698,246 | 10/1987 | Gibbons et al. | 426/127 X |
| 4,701,360 | 10/1987 | Gibbons et al. | 426/127 X |
| 4,795,665 | 1/1989 | Lancaster et al. | 426/106 X |
| 4,806,398 | 2/1989 | Martin, Jr. | 426/127 X |

Primary Examiner—Leo B. Tentoni
Attorney, Agent, or Firm—Michael Ebert

[57] ABSTRACT

A disposable paper pouch enclosing a food product, the pouch being both biodegradable and recyclable. The pouch is made up of two superposed paper plies which are rendered liquid impervious by water-based acrylic layers coated on the inner and outer faces of the plies, the acrylic inner layer having a low melting temperature and the acrylic outer layer having a high melting temperature. The superposed plies are subjected to heat and pressure by standard sealing bars that have no effect on the outer layers but cause the inner layers which face each other to fuse together in a predetermined sealing pattern to define an inner pocket that is fillable with the food product.

8 Claims, 1 Drawing Sheet

PAPER POUCH FOR FOOD PRODUCTS

RELATED APPLICATION

The application is a continuation-in-part of my copending application, Ser. No. 07/906,431, filed Jun. 30, 1992, entitled PAPER POUCH FOR FLOWABLE FOOD PRODUCTS (now U.S. Pat. No. 5,332,586), the entire disclosure of which is incorporated herein by reference.

BACKGROUND OF INVENTION

1. Field of Invention

This invention relates generally to disposable containers for food products, and more particularly to a coated paper pouch for this purpose which is liquid impervious, yet is biodegradable and recyclable.

2. Status of Prior Art

Because of rising environmental concerns, in recent years stress has been placed on disposable containers that can be recycled. Thus a strong preference now exists for bags, cartons and other containers made entirely of paper, for these are biodegradable and can also be recycled. This is not true of those containers or other articles made entirely or in part of synthetic, polymeric plastic materials. Thus a cardboard carton lends itself to recycling, but not if it is lined with synthetic plastic films.

In recycling a paper carton or other paper product, use is made of broke beaters and pulpers which act to shred the waste paper and to produce a paper slurry for further processing. But if the paper product fed into the broke beater includes liners or tapes of synthetic plastic film material, the plastic will contaminate the slurry and render it unusable.

It is now common practice, when serving coffee, to supply cream therefor in a miniature plastic container. A typical container for this purpose is shown in FIG. 7 of the Tokuda et al. U.S. Pat. No. 4,903,842, the container being in the form of a small plastic cup having a rim to which is marginally adhered a plastic cover which can readily be peeled off the rim. In some cases, a metal foil cover is used.

Various forms of disposable, small plastic containers for dispensing food products are disclosed in the Fukushima U.S. Pat. No. 4,790,429, as well as in the Redmond U.S. Pat. Nos. 3,986,640 and 4,724,982. Where the containers disclosed in these patents are of plastic construction or formed of a laminate of plastic and metal foil, they are not biodegradable nor can they be recycled. And where the containers are made of plastics such as polystyrene, should they be incinerated to get rid of them, they will give off noxious fumes.

One well known form of pouch for a hot dog relish is made up of a laminate whose outer ply is a clear polyester film, the inner face of which is printed to identify the contents of the pouch. The inner face of the outer plastic ply is laminated by an adhesive to a foil ply, which in turn is laminated by an adhesive to a polyethylene inner ply. The polyester in this laminate is for exterior strength and tear resistance, the foil is included because it acts as a moisture barrier, and the polyethylene is for sealing purposes.

The manufacturing procedure for this well known pouch involves several steps and is a relatively costly process, for it requires the application of adhesives and the lamination of the polyester ply to the foil ply and then the lamination of the foil ply to the polyethylene ply. This plastic metal foil pouch is neither biodegradable nor can it be recycled.

The reason metal foil has heretofore been used in pouches for flowable food products in which the foil is laminated to a plastic film is that a film, even one of high strength, has some slight degree of porosity. It therefore exhibits a moisture-vapor transmission rate (MVTR), which is unsuitable for a food container, for it reduces the shelf life of the food.

Plastic pouches and those formed of plastic-metal foil laminate are in widespread use not only to package flowable food products such as salad oil, but also to package food powders such as seasoning, soft-drink and muffin mixes. Also packaged in such pouches are solid food products such as meat strips for dogs, candies and pretzels.

These pouches are satisfactory for long storage of their contents, but in no instance are they biodegradable and recyclable. Hence many millions of such pouches which are disposed of after they have served their purpose, now contribute toward environmental pollution.

Moreover, while plastic pouches and those formed of a plastic-metal foil laminate are provided with a weakened line to facilitate tearing of the pouch to provide access to the food product stored therein, they are nevertheless difficult to open, particularly if the user is a senior citizen or disabled.

My above-identified copending application discloses a recyclable paper pouch for enclosing a small supply of flowable material, such as ketchup, the pouch including a pocket for this material and a spout communicating with the pocket which leads to a rupturable outlet that when ruptured permits the flowable material to be expelled through the spout.

The concern of the present application is with paper pouches adapted to store either a solid or a flowable food product, and requiring no spout to expel the product from a pocket in the pouch.

Other prior art interest are the following U.S. patents:

Widiger et al. U.S. Pat. No. 3,558,330

Seiter U.S. Pat. No. 4,421,825

Gibbons et al. U.S. Pat. No. 4,698,246

Gibbons et al. U.S. Pat. No. 4,701,360

Lancaster et al. U.S. Pat. No. 4,795,665

Martin U.S. Pat. No. 4,806,398

SUMMARY OF INVENTION

In view of the foregoing, the main object of this invention is to provide a disposable, liquid-impervious paper pouch for containing a supply of a flowable or a solid food product, the pouch being biodegradable and recyclable and, therefore, environmentally acceptable.

More particularly, an object of this invention is to provide a paper pouch of the above type which is rendered liquid impervious by water-based acrylic polymer layers on the inner and outer faces of the paper, and is free of adhesives.

A significant advantage of a paper pouch in accordance with the invention is that it may be mass-produced by a relatively simple and inexpensive process.

Also an object of the invention is to provide a paper pouch which is so coated as to afford a good MVTR barrier to allow for extended shelf life of the packaged flowable food.

Briefly stated, these objects are attained in a disposable paper pouch enclosing a food product, the pouch being both biodegradable and recyclable. The pouch is made up of two superposed paper plies which are rendered liquid impervious by water-based acrylic layers coated on the inner and outer faces of the plies, the acrylic inner layer having a low melting temperature and the acrylic outer layer having a high melting temperature.

The superposed plies are subjected to heat and pressure by standard sealing bars that have no effect on the outer layers but cause the inner layers which face each other to fuse together in a predetermined sealing pattern to define an inner pocket that is fillable with the food product and a corrugated or otherwise weakened end section which can be torn by a user to provide an outlet for the food product.

BRIEF DESCRIPTION OF DRAWINGS

For a better understanding of the invention as well as other objects and further features thereof, reference is made to the following detailed description to be read in conjunction with the accompanying drawings, wherein.

DETAILED DESCRIPTION OF INVENTION

Figure 1:
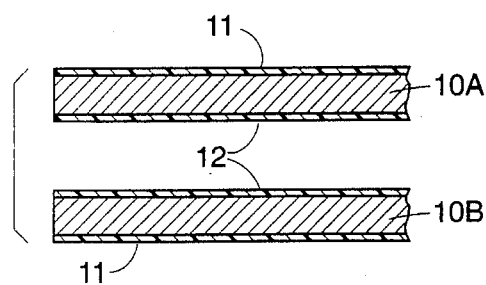
FIG. 1 shows two coated paper plies from which a pouch in accordance with the invention is fabricated.

In a preferred embodiment of a coated paper pouch in accordance with the invention, the pouch is fabricated from two identical plies of paper 10A and 10B, as shown in FIG. 1. Each ply has coated thereon on its outer face a layer 11 of a water-based acrylic material and on its inner face a layer 12 of a water-based acrylic material having different glass transition temperature properties from that of layer 11.

The term acrylic designates products obtained by the polymerization of esters of acrylic or methacrylic acid. A water-based acrylic uses polymers or copolymers composed primarily of the acrylic family; i.e., methyl methacrylate, butyl methylacrylate, methyl acrylate and 2-ethyl hexylacrylate. A water-based acrylic is cured by the loss of water only, but once cured it is impermeable to water or other liquids. The hardness and softness points of these polymers increase as the molecular weight of the ester group increases.

In the manufacturing process, two identical webs of coated paper are drawn from respective supply reels and caused to enter a sealing station in superposed relation where the paper webs are subjected to heat and pressure by sealing bars which serve to seal the two plies in a predetermined sealing pattern that creates an inner pocket for food product to be packaged, the pocket being open at one end.

The so combined webs are then sliced into individual pouches open at one end, whose products are then filled at a filling station with the food product to be packaged which may be in powder or solid form. Then the loaded pouches enter a sealing station where the end section of the pouch which is open is subjected to heat and pressure by sealing dies which act to seal the two plies and at the same time perforate, corrugate or otherwise weaken this end section, so that it can later be torn to provide access to the food contents of the pouch which can then be poured out of the open pouch at a filling station with the flowable food product. Finally, the outlet of the pouch is heat sealed to complete the pouch.

The paper used is of suitable quality and is both fairly tight and of good wet strength. Before the paper is coated with the outer and inner acrylic layers 11 and 12, its outer face is first printed to identify the contents of the pouch. The printing ink used for this purpose is preferably of a soya or other non-toxic composition. Since the acrylic coating overlying the printing is transparent, it not only acts to protect the printing, but also makes it visible to the user of the pouch.

The interior or inner water-based acrylic layer 12 on each paper web must have a low melting temperature, or to be more exact, a low glass transition temperature $T_g$, this being the temperature at which a polymer changes from a vitreous to a softened plastic state. In a high polymer such as an acrylic, this transition point is related to the number of carbon atoms in the ester group.

In the context of the present invention, by a low melting temperature is meant a temperature at which the acrylic layer 12 is rendered molten by a standard heat sealing bar of the type used, for example, to apply pressure and heat to thermoplastic films, such as PVC, to seal them together.

The outer or exterior, water-based acrylic layer 11 must exhibit a relatively high melting temperature or glass transition temperature $T_g$, for this layer must be insensitive to the heat and pressure applied by the same heat sealing bar.

Figure 2:
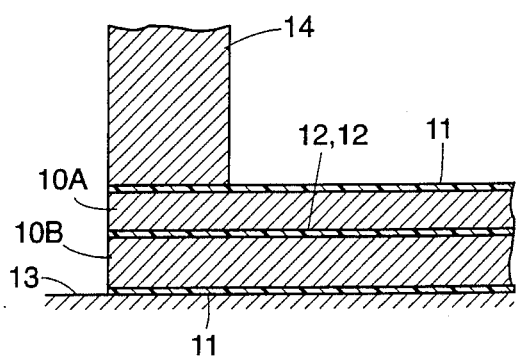
FIG. 2 shows the manner in which the paper plies are sealed together.

Thus as shown in FIG. 2, when paper plies 10A and 10B lie in superposed relation on a platen 13 with the inner layers 12 of these plies in abutting relation, then when a heat sealing bar 14 is pressed down on the two plies, the resultant heat, which is transferred to inner layers 12, will render these layers molten to cause the two plies to fuse together. But the same heat will have no effect on the outer acrylic layers 11.

Acrylic layers 11 and 12 are formulated from ingredients which are acceptable for direct contact with the food to be packaged. And these layers impart to the paper plies a high degree of moisture and product resistance, so that the paper plies withstand not only the food product contained in the pouch, but also the environment in which the pouch is placed, such as the cold and moist atmosphere of a typical refrigerator. And the acrylic coatings on the paper afford a good MVTR barrier, thereby extending the shelf life of the packaged food product.

The water-based acrylic coatings as well as the paper on which they are coated are recyclable under normal repulping conditions. Thus the acrylic coatings degrade under the high temperature and pH conditions which normally prevail in the water scrubber of a repulper system.

Figure 3:
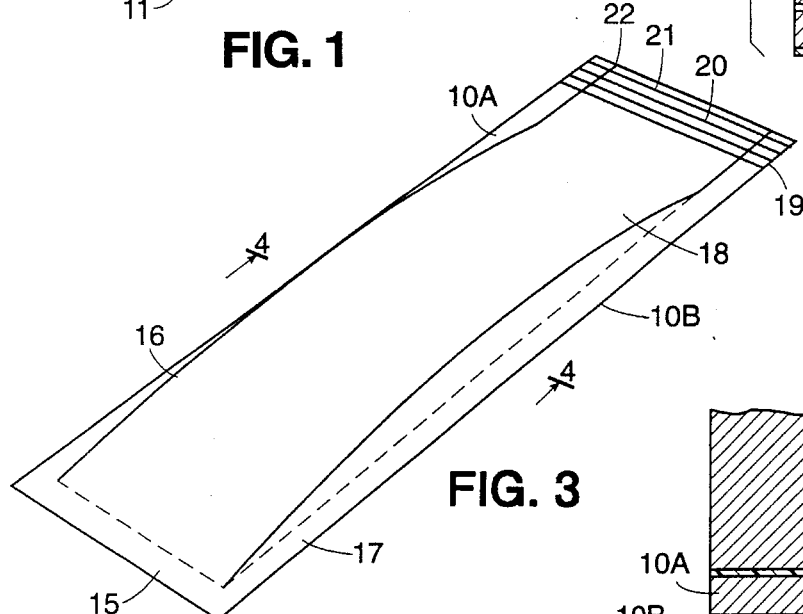
FIG. 3 is a perspective view of a preferred embodiment of a pouch in accordance with the invention.
Figure 4:
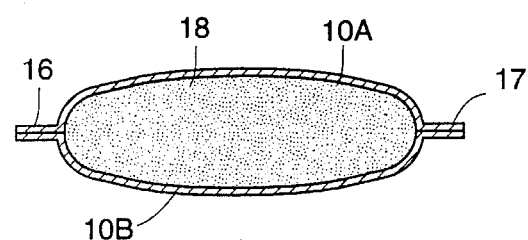
FIG. 4 is a transverse section taken through the pouch in the plane indicated by line 4—4 in FIG. 3.

FIGS. 3 and 4 show one preferred form of a rectangular pouch fabricated by marginally sealing together the coated paper plies 10A and 10B in the manner previously described. The heat sealing pattern in such as to seal the lower end margin 15 of the pouch and side margins 16 and 17 to define between the coated paper plies 10A and 10B an expandable interior pocket 18 which is to be filled with a flowable food product such as powder forming a seasoning mix. The upper end section 19 of the pouch is so sealed and at the same time weakened along transverse parallel lines 20, 21 and 22 which are scored or perforated across end section 19.

Thus all that is necessary to put the pouch to use in the tear the end section 19 along a line at right angles to the lines 20 to 22 to produce an opening in the pouch from which the powder or other food product can be expelled.

The simplest form of a pouch in accordance with the invention is one composed of two coated paper rectangular plies in superposed relation. These are marginally heat sealed along both ends and both sides to define a rectangular pocket for accommodating the flowable food. One of the end margins is weakened so that it can be torn off.

Figure 5:
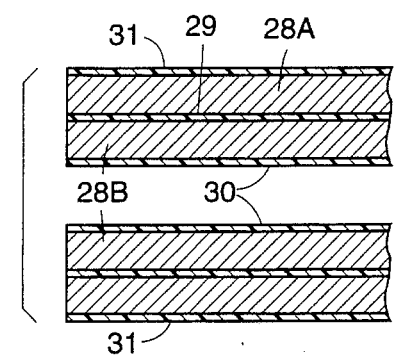
FIG. 5 shows two coated laminated paper plies from which a pouch in accordance with the invention may be fabricated.

In some instances, instead of using two plies of coated paper to form the pouch, each ply consisting of a single sheet of paper, one may use plies, each of which is formed by two interlaminated sheets of paper, as shown in FIG. 5.

Each ply in this instance is composed of two sheets of paper 28A and 28B which are laminated together by a water-based acrylic adhesive 29 to provide a laminate whose inner face is coated with a water-based acrylic layer 30 having a low glass transition temperature $T_g$. The outer face of the paper laminate is coated with a water-based acrylic layer 31 having a high glass transition temperature $T_g$.

Thus when the two paper laminates are in superposed relation and subjected to heat and pressure by a standard sealing bar, the low temperature acrylic layers 30, which are then in abutting relation are rendered molten to seal the paper laminates together to define the inner pocket of the pouch.

The nature of the adhesive and of the acrylic layers is such that the paper pouch lends itself to being recycled. The advantage of the paper laminate for the plies is that the pouch can then have the combined properties of two different papers, but still be recyclable; for the adhesive and the acrylic layers will be removed in the repulping process, leaving only the paper fibers.

The purpose underlying the use of two different papers in the coated laminate is to attain functional or aesthetic properties that are not obtainable with a single sheet. Some papers have better grease barrier properties than others, while other papers have superior water barrier properties. Still others have higher strength or stiffness. By means of a paper laminate, one can integrate the different functional properties of the two papers forming the laminate.

And in regard to aesthetic consideration, certain grades of paper will better accept printing or present a better appearance, even though, by themselves, they lack good package integrity. Thus by joining a paper having the desired printing properties and appearance with a paper having high strength, the resultant laminate takes advantage of all of these properties.

There is a wide range of costs related to different grades of papers. By a proper combination of papers in the laminate, one can produce a more economical pouch, yet one having the necessary package integrity.

In practice, instead of using inner and outer water-based, acrylic polymer layers, respectively having low and high glass transition temperatures, use may be made of layers formed of polyester, urethane and other synthetic materials having the required glass transition temperatures. But where the nature of these materials is such that it is not recyclable in a paper recycling process, then the paper pouch which includes these materials cannot be recycled.

And in manufacturing the paper pouch, instead of using two identical webs of coated paper drawn from respective reels, one may use a single web of coated paper, which when drawn from a reel is fed into a folder which folds the web in half to produce superposed halves with their inner layers in contact with each other, the superposed halves then being heat sealed. And instead of paper plies, each of which is a laminate of two paper sheets, this laminate may be formed of three or more paper sheets to provide a pouch of high strength.

Figure 6:
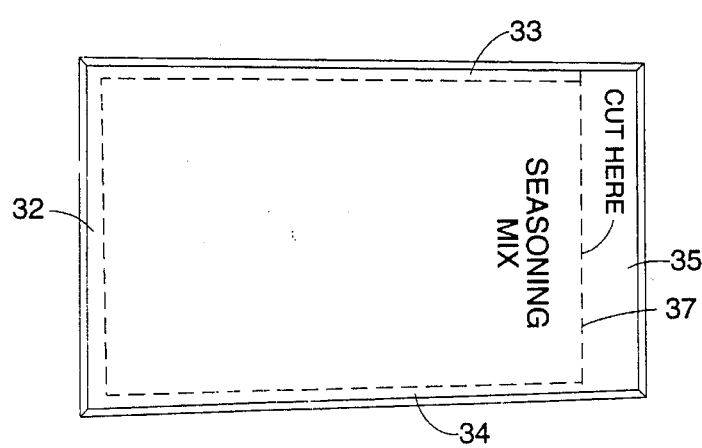
FIG. 6 shows another embodiment of a pouch.

The pouch shown in FIG. 6 is essentially the same as that in FIG. 3, the pocket to receive a food product being formed by marginally sealing the lower end 32 and the sides 33 and 34 of the superposed paper plies. The upper end 35 of the pouch is also sealed by heat and pressure. However, this margin has printed thereon a cut line 37 so that to open the pouch the cut line is scizzored by the the user.

While there has been shown preferred embodiments of the invention, it is to be understood that many changes may be made thereon without departing from the essential features of the invention. Thus while we have described the pouch as useable for packaging food products, since the pouch is liquid-impermeable it may be used to package moist potting soil or moist towelettes. Or it may be used to package dry chemical wafers, for whether the product is moist or dry, the pouch will maintain this condition.

I claim:

1. A recyclable pouch for packaging a food product comprising two superposed plies each formed by at least one sheet of paper, each ply having an inner face coated with a layer of a water-based acrylic polymer having a low glass transition temperature, and an outer face coated with a water-based acrylic polymer having a relatively high glass transition temperature, the layers on the inner faces of the plies being in abutting relationship, said superposed plies being sealed together in a predetermined sealing pattern by heat and pressure applied thereto which brings about fusion of the inner layer but does not affect the outer layers, said sealing pattern defining an expandable interior pocket for accommodating the food product, whereby said pouch because it is composed of paper and water-based acrylic polymers is recyclable in a paper recycling facility.

2. A pouch as set forth in claim 1, wherein said outer acrylic layers are transparent and said outer face of the paper ply which is covered by said outer acrylic layers are printed to identify the contents of the pouch.

3. A pouch as set forth in claim 1, wherein said pouch is rectangular and one sealed end thereof is weakened so that the pouch may be torn open to provide access to the food product.

4. A pouch as set forth in claim 1, wherein said inner and outer acrylic polymer layers render said plies resistant to the transmission of vapor.

5. A pouch as set forth in claim 1, wherein each ply is formed by two sheets of paper which are laminated together.

6. A pouch as set forth in claim 5, wherein the two sheets have dissimilar functional properties.

7. A pouch as set forth in claim 5, wherein the two sheets are joined together by a water-based acrylic adhesive.

8. A pouch as set forth in claim 3, in which the one sealed end is weakened by parallel score lines.

* * * * *